United States Patent Office 3,368,130
Patented Feb. 6, 1968

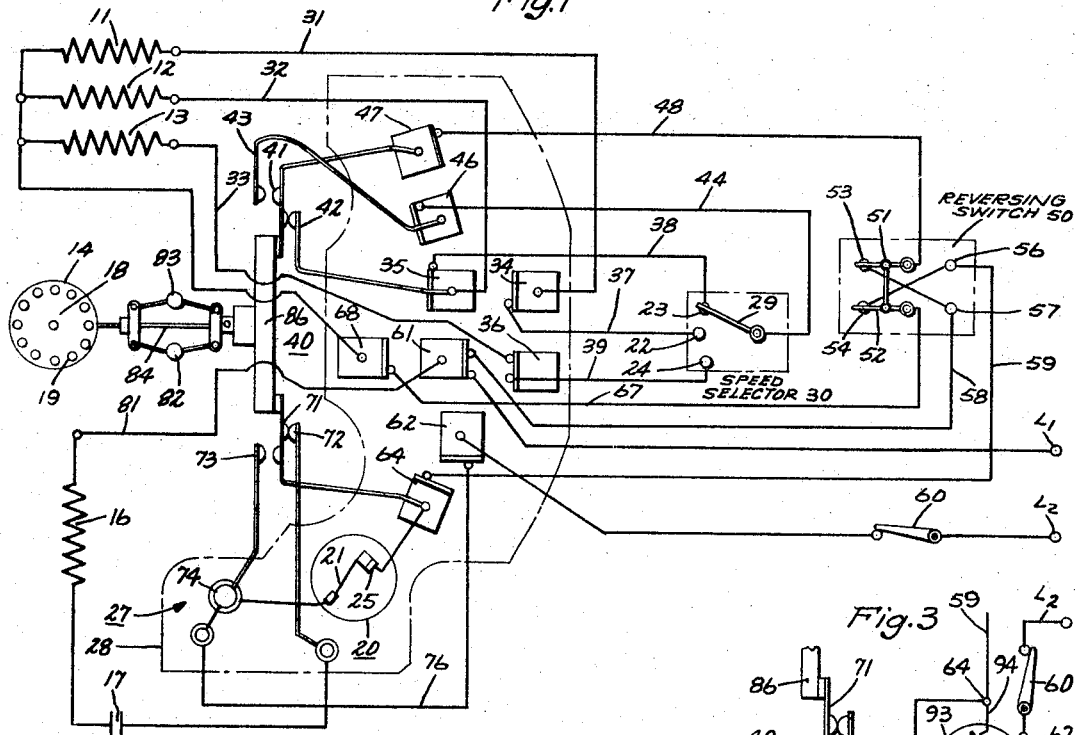

3,368,130
ELECTRIC MOTOR WINDING CONTROL AND
PROTECTION ARRANGEMENT
Joseph V. Bussone, Sycamore, Ill., assignor to General
Electric Company, a corporation of New York
Filed Sept. 13, 1965, Ser. No. 486,963
6 Claims. (Cl. 318—221)

ABSTRACT OF THE DISCLOSURE

In order to connect main on auxiliary windings to a power source and to protect motor windings below a predetermined speed, a circuit interrupting device responsive to adverse motor conditions is connected in circuit below the predetermined speed with a switching arrangement having at least one switch capable of disconnecting at least auxiliary windings from the source of power. Below the predetermined speed the switching arrangement renders the circuit interrupting device effective to control the energization of the windings including the auxiliary windings. This circuit interrupting device, however, is bypassed at the predetermined speed and is thereby rendered ineffective to control the energization of the windings. Thus, the windings are protected by the device below the predetermined speed against possible damage from adverse motor conditions, and nuisance tripping or recycling of the circuit interrupting device is prevented.

This invention relates to dynamoelectric machines and more particular to an improved winding control and protection arrangement especially suitable for use in multspeed single phase alternating current induction type electric motors.

For certain dynamoelectric machine applications, such as single phase electric motors employed in domestic appliances and industrial equipment, it is especially desirable, if not essential, that the machine include a protective or overload device responsive either to the temperature of temperature sensitive components, such as windings or to the current supplied to such components. A thermal overload switch is typical of such protective devices and is normally connected in circuit with the windings which are excited during running condition. In regard to motor applications where high starting torque per ampere is extremely important for a given motor size (e.g., automatic washers), the motor customarily utilized in of the split phase type, incorporating at least one main excitation or running winding and an auxiliary or start winding which is disconnected from the power source once the motor reaches a predetermined speed of operation. De-energization of the start winding is usually accomplished by a centrifugally operated mechanism responsive to the motor speed, the mechanism actuating and opening a switch, connected in the start winding circuit, when the motor attains the predetermined speed. For multispeed motors, conventionally one run winding and the start winding are concurrently energized during starting. When the motor reaches the predetermined speed, a selected run winding is excited to produce the desired speed of operation.

In the past, difficulty has been experienced with the foregoing approach, especially in multispeed reversible motors, in so-called "nuisance tripping" or recycling of the thermal overload switch device. By way of example, at the predetermined speed when a second selected run winding is being energized for run operation and the initially excited run and start windings are being disconnected from the power source, there has been a tendency for the overload switch to trip and momentarily interrupt or open the second selected run winding circuit at the very moment when excitation of that run winding is required to develop torque. Another problem with the above approach has been the inadequate protection afforded the motor under a "locked rotor" condition where the windings are energized but the rotor is prevented from rotating for one reason or another. This, in turn, may result in a dangerous overheating of the motor and premature motor failure.

Thus, it is a primary object of the present invention to provide an improved electric motor winding control and motor protection circuit arrangement.

It is another object of the present invention to provide an improved electric motor winding control and protection arrangement, including a thermal overload circuit interrupting device and having at least one winding de-energized when the motor reaches a predetermined speed of operation, which not only affords protection of the motor at speeds below the predetermined speed but also reduces the tendency of the overload switch device to recycle repeatedly at the predetermined speed.

It is a further object of the present invention to provide an improved, yet economical, multispeed electric motor control and protection arrangement which incorporates the desirable features mentioned heretofore.

In carrying out the objects of the present invention in one form, I provide an improved winding control and protection circuit for multispeed single phase split phase electric motor having main winding means for producing selective operation at two or more different running speeds and an auxiliary winding means connectable with at least a part of the main winding means below a predetermined speed to start rotation of the motor. A speed responsive swtich assembly and a thermal protector or overload device connect the part of the main winding means and the auxiliary winding means in parallel below the predetermined speed such that the protector device effectively controls the energization of the parallel winding circuit. At the predetermined speed, the speed responsive switch is actuated and renders the protector device ineffective of such control. At this time, a speed selector switch is placed in closed circuit with a selected part of the main winding means to energize the selected part to obtain the desired running speed independent of the thermal protector device.

Consequently, for rotation of the motor below the predetermined speed, the thermal device which is responsive to adverse conditions of the motor will disconnect the parallel connected winding means to de-energize the motor should the circumstances warrant, such as a heated condition of the energized windings due to the well-known locked rotor situation. After the attainment of a safe operating situation and the heated condition has been abated, the device, if of the automatic reset type, may operate once again to close the circuit for energizing the windings. In addition, with the foregoing approach, the tendency of the protector device to "nuisance trip" or recycle at the predetermined speed will be reduced, if not entirely eliminated regardless of the running speed selected for operation. These advantageous features are provided in spite of the use of a single protector device in the multispeed motor arrangement.

The subject matter which I regard as my invention is particularly pointed out and distinctly claimed in the concluding portion of this specification. My invention, itself, however, both as to its organization and method of operation, together with further objects and advantages thereof, may best be understood by reference to the following description taken in connection with the accompanying drawing where:

FIGURE 1 is a schematic winding control circuit diagram showing one form of the present invention embodied in a multispeed, single phase reversible induction type electric motor, the motor being selectively energized under starting conditions;

FIGURE 2 is a simplified schematic circuit diagram of the motor revealed by FIGURE 1, with the motor being excited under running conditions for one selected speed of operation; and FIGURE 3 is a schematic circuit diagram of a part of the circuit shown in FIGURE 2, the illustrated portion of the circuit being modified to incorporate a thermal protector of the type having an anticipatory heater.

Turning now to the drawing in more detail, for purposes of explanation I have shown the preferred form of my invention in connection with the control and protection of the winding circuits in a reversible, multispeed single phase, split phase induction type alternating current electric motor selectively operative at three different running speeds. In the exemplification, three main field excitation winding sections 11, 12, and 13 accommodated in the slots of a stator member (not shown) are separately and selectively connectable to power lines $L_1$, $L_2$ of an alternating source of power in order to attain the three different speeds. However, under starting conditions of the motor below a predetermined rotational speed of rotor assembly 14, main winding section 12 and an auxiliary winding section 16, having a serially attached current phase displacing capacitor 17, are adapted to be connected in parallel between lines $L_1$, $L_2$ to develop the desired starting torque. The rotor assembly 14 is conventionally constructed with a magnetic core 18 which in turn carries an electrically conducting non-magnetic squirrel cage secondary winding fabricated with the usual angularly spaced apart conductor bars short-circuited at each end of the core by end rings.

Under starting conditions shown by the motor circuit diagram of FIGURE 1, a single winding circuit interrupting device in the form of a common thermal protector switch device 20, having suitable circuit interrupting characteristics to be discussed more fully hereinafter and a temperature or current sensitive bimetallic element 21, is effective to control the energization of the parallel connected winding sections 12 and 16 below the predetermined speed. In addition, the single protector device 20 is rendered ineffective of such control at the predetermined speed regardless of the running speed selected for the motor, in a manner that will be described in detail below.

In particular, for the illustrated reversible multispeed motor of the exemplification, one side of each of the three main winding sections 11, 12, and 13 is respectively connected to a corresponding number of stationary contact posts 22, 23, and 24 of a standard three-position rotary type speed selector switch 30. These connections may readily be accomplished through a switch mounting and terminal board assembly 27, shown by the broken lines in FIGURE 1 and having a support member 28 fabricated of suitable insulating material, such as fiber board. Conductor leads 31, 32, and 33 connect the one side of each of the main winding sections to terminal studs 34, 35 and 36 secured to the support member 28, with leads 37, 38 and 39 respectively completing the circuit from each terminal post to the associated stationary contact post of the speed selector switch 30. The manually operated rotary contact or speed selector arm 29 of switch 30, selectively engageable with the three posts 22, 23, 24, is connected to one power line of the power source through any suitable reversing switch 50 which controls the direction of current supplied to the three main winding sections.

As illustrated, selector arm 29 is serially connected to a run contact 43 of a first set of contacts of a speed responsive switch assembly 40 through conductor 44 and terminal 46 mounted to assembly 27. The first set of switch contacts also has a double headed movable contact 41 supported by assembly 27 for alternate engagement with the run contact at the predetermined speed or with a start contact 42 below the predetermined speed, contacts 42, 43 being in spaced relation with one another. The start contact 42 is serially attached to terminal 35, which also serves as a common terminal for post 23 of speed selector switch 30 and the one side of main winding section 12, the main winding section excited below the predetermined speed. Movable contact 41, which is biased toward run contacts 43, is in circuit through terminal 47 and lead 48 with one of a pair of electrically separated manually operated conductive blades 51, 52 of a conventional double pole, double throw reversing switch 50. These blades are thus adapted to make a closed circuit alternating with either stationary contacts 53, 54 or contacts 56, 57. In order to reverse current flow through switch 50, the switch has contacts 53, 57 in series as well as the pair of contacts 54, 56. Reversing switch contact 57 is in turn connected to power line $L_1$ through conductor 58 and power input terminal 61, while contact 56 of switch 50 is connectable to power input terminal 62 and line $L_2$ through conductor 59, terminal 64, and a closed electrical path to be described more fully hereinafter including either through a second set of contacts of the speed responsive assembly 40 at the predetermined speed or through device 20 below that speed. The other side of the three main winding sections and the second blade 52 of the reversing switch are placed in series circuit by conductors 66, 67 and terminal 68 carried by member 28.

In the main winding circuit just described, main winding sections 11, 12, and 13 are thus selectively excited across terminals 61, 64, with the reversing switch 50, having contacts 56, 57 serially attached to these terminals, determining the direction of current flow through the main winding section selected for excitation.

Auxiliary winding section 16 and capacitor 17 are also connectable across terminals 61, 64 through a second set of contacts of responsive switch means 40, the second set of contacts also being supported by insulating member 28 of assembly 27. A double headed movable contact 71 of the second set operable in response to the speed of the motor, is alternately engageable between a start contact 72, in circuit with one side of winding section 16, and a run contact 73 which is connected from its mounting post 74 on member 28 to input terminal 62 by conductor 76. In the exemplification, by providing thermal protector device 20 directly between one of the input terminals 62 and terminal 64, which is common to both the auxiliary winding section 16 and all of the main winding sections, device 20 and the speed responsive switch assembly 40 cooperate to achieve the desired effective winding control and protection of the motor below the predetermined speed.

The manner in which my improved winding control and protection arrangement operates in the illlustrated exemplification will now be considered. It will be recalled that FIGURE 1 shows the various circuit components of the multispeed electric motor under starting conditions. With the rotation of rotor assembly 14 being less than the predetermined speed, the movable contacts 41, 71 of the speed responsive switch assembly 40 are in engaging relation with their associated start contacts 42, 72 and in open circuit with run contacts 43, 73. It will be assumed that the position of blades 51, 52 of the reversing switch 50 shown in FIGURE 1 provides counter clockwise rotation for the motor. To initiate operation of the motor, a manually OFF-ON switch 60 in power line $L_2$ is closed and winding sections 12, 16 are energized in parallel with one another between terminals 61, 64.

More specifically, a closed electrical path extends from one side of main winding section 12 to power input terminal 61 through the engaging movable and start contacts 41, 42 of switch assembly 40, blade 51, posts 53, 57 of reversing switch 50, and finally through conductor 58 to the power input terminal 61. The other side of section 12 is electrically joined to common terminal 64 by way of blade 52, posts 54, 56 of reversing switch 50, and conductor 59. Since the speed selector arm 29 of switch 30 is in circuit with run contact 43, which is in open circuit at this time, and each of the three main winding sections has one side electrically joined to the stationary contact posts of switch 30. The speed selector switch 30 is inoperative to control excitation of the main winding sections. With respect to auxiliary winding section 16, it has one side directly attached to input terminal 61 with the other side passing through the engaging movable and start contacts 71, 72 of the speed responsive switch assembly 40 to terminal 64.

With run contact 73 of speed responsive switch assembly 40 being in open circuit, the electrical path between the second input terminal 62 and common terminal 64 is effectively controlled entirely by circuit interrupting device 20 which is connected between these two terminals by way of post 74 and conductor 76. Consequently, by making device responsive to any preselected adverse condition of the motor, it is capable of effectively controlling the excitation of the motor and disconnecting it from the power source when the adverse condition is approached.

For purposes of illustration, it will be assumed that device 20 is of the winding temperature responsive kind disclosed in U.S. Patent No. 2,909,719 issued on Oct. 20, 1959 to C. A. Dubberley. In order to protect the motor of the exemplification, device 20 should be located in close proximity and in direct heat exchange relation to both winding sections 12, 16. The temperature sensitive characteristics of the device, including bimetallic element 21, should be chosen such that element 21 will open when either of the winding sections 12 or 16 attains an elevated temperature below that which will adversely affect temperature sensitive components of the motor; e.g. winding insulation. For instance, in case of a stalled rotor condition, that is, with the rotor prevented from reaching the predetermined speed for any reason, a heated condition in the vicinity of the energized windings would be caused which could raise the winding temperature to a point where element 21 is actuated away from stationary contacts 25. This would break the power supply circuit from lines $L_1$, $L_2$ to de-energize or disconnect winding sections 12, 16. The winding circuit will remain open until the protective device 20, if of the automatic reset kind, again senses a safe operating temperature for the motor and it closes the winding circuit it previously opened. Obviously, the exact construction of device 20 is not critical to the practice of the present invention and a device other than that disclosed in the Dubberley patent may be utilized; e.g. the type of protector disclosed in Patent 2,369,986 issued to E. J. Schaefer.

When the motor reaches the predetermined speed, movable contacts 41, 71 of the speed responsive switch assembly 40 are concurrently actuated away from engagement with their associated start contacts 42, 72 thereby opening the circuit to winding sections 12, 16 and into engagement with the associated run contacts 43, 73 shown by FIGURE 2 to energize the desired main winding section as selected by selector switch 30. Any suitable means may be employed to actuate assembly 40 in the illustrated embodiment. One such means, for example, is the centrifugal mechanism responsive to the speed of motor rotation described in U.S. Patent No. 2,149,108 issued to Alfred F. Welch on February 28, 1939. The mechanism has a pair of centrifugal weights 82, 83 secured to rotate with the rotor shaft 84 and adapted to react under centrifugal force at the predetermined speed to move a so-called push collar 86 axially of the shaft for concurrently actuating movable contacts 41, 71 of the speed responsive switch assembly 40.

In considering running operation of the multispeed motor, it will be assumed that the running speed produced by main winding section 12 is desired, the same winding section excited in parallel with auxiliary winding section 16 during starting conditions. The setting of speed selector arm 29 of switch 30, which is determinative of the main winding section to be excited for running operation, is thus in closed circuit with post 23. Under these conditions, main winding section 12 has a completed electrical path between power input terminals 62, 64 while all the other winding sections are in open circuit. The one side of section 12 is connected to run contact 43 of switch assembly 40 through conductors 32, 38, terminal 35, speed selector switch 30, conductor 44 to post 46 and hence run contact 43. The remainder of the circuit path through reversing switch 50 to terminal 61 is the same as that already described in connection with the starting conditions. In addition, the electrical path between the other side of winding section 12 and common terminal 64 is also identical to that for starting conditions.

However, the electrical path between common terminal 64 and input terminal 62 is significantly altered in that device 20 has been rendered ineffective of winding control. A closed low resistance path is now established through the engaging movable and run contacts 71, 73 of switch assembly 40 thereby by-passing device 20 which is short-circuited between terminals 62, 64 and rendered ineffectual. With device 20 being short-circuited at the predetermined speed when winding sections 12, 16 are de-energized and during running conditions when a selected main winding section is excited, the device is ineffective of controlling or interrupting the completed circuit path under these conditions. Further, where a different main winding section is excited for running conditions than for starting where a change in the number of magnetic poles might occur at the predetermined speed, "nuisance tripping" of device 20 will be avoided in view of the circuit alteration explained above in regard to device 20.

It will be recognized from the discussion of FIGURES 1 and 2 that if a running speed for the multispeed motor of the exemplification is desired other than that produced by the excitation of main winding section 12, speed selector arm 29 of the speed selector switch 30 may be manually turned into contact with either contact posts 22 or 24 to excite either main winding section 11 or section 13.

If clockwise rotation of the motor is desired, blades 51, 52 of reversing switch 50 may be transferred as a unit from the illustrated position to engage contact posts 56, 57 respectively. Therefore, both below and at the predetermined speeds, the current supplied to the selected main winding section will be in a reverse direction from that provided by reversing switch 50 as shown to furnish reverse rotation for the multispeed motor.

It should be appreciated by those skilled in the art that the predetermined speed at which device 20 is rendered ineffective and the most desirable construction of the speed responsive means employed to render the device ineffective will be dependent upon many variable factors, such as the kind of electric motor incorporating my invention and the precise motor application. The present invention, for example, may be advantageously employed in connection with a multispeed motor including the main and auxiliary winding means and the speed responsive components having the predetermined actuating speed disclosed in the copending application Ser. No. 486,674, filed Sept. 30, 1965, now Patent No. 3,350,614 of Harold C. Stout, filed the same day as the present application. Further, although as used in the illustrated embodiment of switch assembly 40, the term "contact" identifies an electrically conducting blade carrying either a single or double headed contact mounted in cantilever fashion on an insulating member of the type generally revealed in the Stout application. Obviously, this is by way of illustration and other kinds of speed responsive means may be utilized in the satisfactory practice of my invention; e.g. electromagnetically operated switch relays responsive to induced voltage at the predetermined speed. The subject matter of the C. E. Linkous U.S. Patent No. 3,256,204 is representative of this approach.

Turning now to a consideration of FIGURE 3, a current interrupting device 90 is schematically illustrated having a resistance heater 93 arranged in heat transfer relationship to a bimetallic element 91, the type disclosed in Patent 2,771,528 granted to D. E. Moran on Nov. 20, 1956. In order to simplify the explanation, except for the portion of the circuit illustrated in FIGURE 3 and discussed below, the circuit is identical with that already described and shown in connection with FIGURES 1 and 2 for the multispeed reversible electric motor of the exemplification and the same character references indicate identical components. In the circuit shown by FIGURE 3, bimetallic element 91 is in series between input terminal 62 and run contact 73 of the speed responsive switch assembly 40 via conductor 92. Resistance heater 93 of device 90 has one end attached to a stationary contact cooperating with bimetallic element 91 and the other end connected through conductor 94 to terminal 64 which, as in FIGURES 1 and 2, is common to movable contact 71 and to contact post 56 of reversing switch 50 through conductor 59. Start contact 72 is in direct circuit with a side of auxiliary winding section 16 and capacitor 17.

Consequently, for operation of the motor below the predetermined speed, winding sections 12, 16 will be excited in parallel as before with the exception that, as shown in FIGURE 3, the effective current path between terminals 62, 64 is through serially connected bimetallic element 91 and resistance heater 93. Thus, should adverse motor conditions so dictate below the predetermined speed, device 90 is capable of effecting interruption of current to common terminal 64 to de-energize winding sections 12, 16 until the adverse conditions become abated. At the predetermined speed when the run contacts 43, 73 of speed responsive switch assembly 40 are in closed contact in the way shown by FIGURE 2, a closed electrical path in the circuit of FIGURE 3 is provided through bimetallic element 91 and engaging contacts 71, 73 of assembly 40 to terminal 64. However, the higher resistance path of heater 93 will be in effect "shorted" out between terminals 62, 64 which, for the type of device 90, is tantamount to rendering device 90 ineffective in the control of the closed electrical path between terminals 62, 64 and hence ineffective to interrupt power supplied to the winding circuit.

While in accordance with the patent statutes, I have described what at present is considered to be the preferred embodiments of my invention, it will be obvious to those skilled in the art that numerous changes and modifications may be made therein without departing from the invention and it is therefore aimed in the appended claims to cover all such equivalent variations as fall within the true spirit and scope of the invention.

What I claim as new and desire to secure by Letters Patent of the United States is:

1. In a multispeed motor winding control and protection arrangement, main winding means for producing selective operation at two or more different running speeds; auxiliary winding means having one side connectable to one power line of a power source; speed selector switch means having at least two running positions individually connected in circuit with portions of said main winding means and a movable speed selector selectively engageable therewith to control the desired running speed for the motor; first speed responsive switch means having a start contact in circuit with a selected part of said main winding means and with one running position of said speed selector switch means, a run contact in series with said movable speed selector of said speed selector switch means, and a movable contact operable between said start and run contacts in response to a predetermined speed of the motor; second speed responsive switch means operable at the predetermined speed including a start contact in series with said auxiliary winding means, a run contact connectable to another power line of the power source, and a movable contact alternately engageable with the associated start and run contacts; said movable contacts of said first and second speed responsive switch means being respectively engageable with their associated start contacts below the predetermined speed and with their associated run contacts at the predetermined speed; and a thermal protector device having circuit interrupting means regulated by thermal conditions of the motor in circuit controlling relation with the movable contact of said second speed responsive switch means below the predetermined speed to control concurrent energization of said selected part of the main winding means and of said auxiliary winding means.

2. In a reversible, multispeed motor winding control and protection arrangement, main winding means for producing selective operation at two or more different running speeds; auxiliary winding means having one side connectable to one power line of a power source; speed selector switch means having at least two running positions individually connected in circuit with portions of said main winding means and a movable running speed selector selectively engageable therewith to choose the desired running speed for the motor; reversing switch means for determining the direction of motor rotation connectable to the one power line; speed responsive switch means including a first set of switch contacts having a start contact in circuit with a selected part of said main winding means and with one running position of said speed selector switch means, a run contact in series with said movable running speed selector of said speed selector switch means, and a movable contact operable between said start and run contacts in response to a predetermined speed of the motor and connected to said reversing switch means whereby below the predetermined speed, said movable contact and start contact close the circuit path between said main winding part and said reversing switch means and at the predetermined speed said movable and run contacts close the circuit between the movable speed selector and said reversing switch means; said speed responsive switch means including a second set of switch contacts operable at the predetermined speed including a start contact in series with said auxiliary winding means, a run contact connectable to another power line of the power source, and a movable contact alternately engageable with said start and run contacts of said second set and being connected to said reversing switch means; and a thermal protector device having circuit interrupting means in normally closed circuit with the movable contact of said second set of switch contacts of the speed responsive switch means below the predetermined speed for controlling the energization of said part of the main winding means and of said auxiliary winding means, whereby said thermal protector is effective to de-energize the motor below the predetermined speed to protect the winding means from damage resulting from adverse thermal motor conditions.

3. In an electric motor winding control and protection arrangement, winding means connectable to one power line of a power source; circuit interrupting means responsive to adverse motor conditions connectable to another power line of the power source; switch means connected in circuit with the circuit interrupting means between the one and another power lines for rendering said circuit interrupting means effective to control the energization of at least a part of said winding means from the power source below a predetermined speed of rotation and for bypassing the circuit interrupting means thereby rendering said circuit interrupting means ineffective to control such energization at the predetermined speed whereby the circuit interrupting means disconnect the motor winding means from the power source only below the predetermined speed to protect the motor against possible damage from the adverse motor conditions.

4. In an electric motor winding control and protection arrangement, main winding means and auxiliary winding means respectively connectable to one power line of a source of power; a winding circuit interrupting device connectable to another power line of the source of power; switch means operable in response to a predetermined speed of motor rotation for rendering said winding circuit interrupting device effective to control the energization of at least a portion of said main winding means and said auxiliary winding means from the source of power below the predetermined speed, and at said predetermined speed for de-energizing at least said auxiliary winding means while rendering said winding circuit interrupting device ineffective to control the energization of the winding means whereby said circuit interrupting device protects the motor by being capable of disconnecting the motor winding means from the source of power below the predetermined speed of rotation.

5. In an electric motor winding control and protection arrangement, main winding means and auxiliary winding means respectively connectable to one power line of a source of power; a thermally sensitive device having circuit interrupting means therein connectable to another power line of the source of power; switch means operable in response to a predetermined speed of motor rotation for establishing a closed electrical path below the predetermined speed between at least a part of the main winding means and auxiliary winding means to effect energization thereof, and for opening an electrical path at said predetermined speed between said thermally sensitive device and at least the auxiliary winding means to disconnect said auxiliary winding means from the other power line and to short-circuiting at least said circuit interrupting means of the circuit through said thermally sensitive device whereby nuisance circuit interruption at said predetermined speed resulting from a momentary opening of the thermally sensitive device is minimized and the motor is protected against excessively high thermal conditions below said predetermined speed.

6. In a multispeed electric motor winding control and protection arrangement, main winding means for producing selective operation at two or more running speeds and auxiliary winding means respectively connectable to one power line of a source of power; first switch means for selecting the desired running speed connected to said main winding means; thermal overload means connectable to another power line of the source of power; second switch means operable in response to a predetermined speed of motor rotation for rendering said thermal overload means effective to control the energization of a selected part of said main winding means and of said auxiliary winding means from the source of power below the predetermined speed, and at said predetermined speed of rotation for de-energizing at least said auxiliary winding means, and for rendering said first switch means effective to control the desired running speed and the thermal overload means ineffective to control the energization of the selected part of the main and the auxiliary winding means, whereby below said predetermined speed of rotation said thermal overload means controls the energization of said selected part of the main winding means and of said auxiliary winding means independently of said first switch means to protect the motor against thermally excessive conditions.

References Cited
UNITED STATES PATENTS

| | | | |
|---|---|---|---|
| 2,165,082 | 7/1939 | Weber | 318—221 |
| 2,166,323 | 7/1939 | Raney | 318—221 |
| 2,689,933 | 9/1954 | Veinott | 318—221 |
| 2,752,548 | 6/1956 | Seely | 318—221 |

ORIS L. RADER, *Primary Examiner.*

G. RUBINSON, *Assistant Examiner.*